(12) United States Patent
Kelly

(10) Patent No.: US 11,038,935 B2
(45) Date of Patent: Jun. 15, 2021

(54) VOIP OOB SERVICES

(71) Applicant: Tadhg Kelly, Boonton, NJ (US)

(72) Inventor: Tadhg Kelly, Boonton, NJ (US)

( * ) Notice: Subject to any disclaimer, the term of this patent is extended or adjusted under 35 U.S.C. 154(b) by 0 days.

(21) Appl. No.: 16/274,673

(22) Filed: Feb. 13, 2019

(65) Prior Publication Data

US 2019/0253463 A1 Aug. 15, 2019

Related U.S. Application Data

(60) Provisional application No. 62/630,017, filed on Feb. 13, 2018.

(51) Int. Cl.
| | |
|---|---|
| *H04L 12/26* | (2006.01) |
| *H04L 29/06* | (2006.01) |
| *H04M 7/00* | (2006.01) |

(52) U.S. Cl.
CPC ........ *H04L 65/1076* (2013.01); *H04L 65/104* (2013.01); *H04L 65/1006* (2013.01); *H04L 65/1036* (2013.01); *H04M 7/0066* (2013.01)

(58) Field of Classification Search
None
See application file for complete search history.

(56) References Cited

U.S. PATENT DOCUMENTS

| | | | |
|---|---|---|---|
| 6,546,016 B1 | 4/2003 | Gerszberg et al. | |
| 8,184,530 B1* | 5/2012 | Swan | H04W 76/12 370/230 |
| 9,356,988 B2 | 5/2016 | Shuman et al. | |
| 9,515,938 B2 | 12/2016 | Menezes et al. | |
| 9,681,161 B2 | 6/2017 | Gonder et al. | |
| 2002/0162116 A1 | 10/2002 | Read et al. | |
| 2009/0003386 A1 | 1/2009 | Mathur et al. | |
| 2011/0096762 A1 | 4/2011 | Basart | |
| 2012/0137332 A1* | 5/2012 | Kumar | H04N 21/41407 725/62 |
| 2012/0269185 A1* | 10/2012 | Castleman | H04M 7/0027 370/352 |
| 2014/0204955 A1 | 7/2014 | Kelly | |
| 2015/0049657 A1* | 2/2015 | Cheng | H04W 52/028 370/311 |

(Continued)

FOREIGN PATENT DOCUMENTS

CN 102299962 A 12/2011

OTHER PUBLICATIONS

International Search Report and Written Opinion dated May 14, 2019, for corresponding International Application No. PCT/US19/17839, International Filing Date Feb. 13, 2019, consisting of 9-pages.

*Primary Examiner* — Brandon M Renner
(74) *Attorney, Agent, or Firm* — Gearhart Law LLC

(57) ABSTRACT

Systems and methods for providing direct voice over Internet protocol (VOIP) services using an out of band (OOB) device are provided. The system includes one or more multiplexed wires configured to relay a consolidated digital signal, the consolidated digital signal including one or more VOIP signals from a VOIP network, and one or more digital signals from a data network. The system further includes a Session Initiation Protocol (SIP) trunk configured to filter out non-VOIP signals from the consolidated signal, enabling a filtered VOIP signal to pass through the SIP trunk, and a VOIP OOB device configured to relay the filtered VOIP signal to an edge device.

8 Claims, 4 Drawing Sheets

(56) References Cited

U.S. PATENT DOCUMENTS

2016/0219024 A1* 7/2016 Verzun .................. H04L 9/0662
2017/0063602 A1   3/2017 Menezes et al.
2018/0013893 A1* 1/2018 Cohen ................ G06Q 10/0631

* cited by examiner

200

```
┌─────────────────────────────────────────────────┐
│  ONE OR MORE FIRST SIGNALS ARE CONVERTED INTO   │
│         ONE OR MORE VOIP SIGNALS                │
│                     205                         │
└─────────────────────────────────────────────────┘
                          │
                          ▼
┌─────────────────────────────────────────────────┐
│  ONE OR MORE DIGITAL VOIP SIGNALS ARE RELAYED FROM │
│          ONE OR MORE VOIP NETWORKS              │
│                     210                         │
└─────────────────────────────────────────────────┘
                          │
                          ▼
┌─────────────────────────────────────────────────┐
│    ONE OR MORE DIGITAL SIGNALS ARE RELAYED FROM │
│      ONE OR MORE PRIVATE (DATA) NETWORKS        │
│                     215                         │
└─────────────────────────────────────────────────┘
                          │
                          ▼
┌─────────────────────────────────────────────────┐
│ VOIP SIGNALS AND DIGITAL SIGNALS FROM THE PRIVATE (DATA) │
│          NETWORK ARE CONSOLIDATED               │
│                     220                         │
└─────────────────────────────────────────────────┘
                          │
                          ▼
┌─────────────────────────────────────────────────┐
│ CONSOLIDATED SIGNALS PASS THROUGH ONE OR MORE   │
│             MULTIPLEXED WIRES                   │
│                     225                         │
└─────────────────────────────────────────────────┘
                          │
                          ▼
                         (A)
```

FIG. 3

VOIP OOB SERVICES

CLAIM OF PRIORITY

This application is a United States non-provisional application and claims priority to U.S. Provisional Patent Application No. 62/630,017, filed Feb. 13, 2018, herein incorporated by reference in its entirety.

FIELD OF THE EMBODIMENTS

The embodiments of the present invention relate to voice over IP (VOIP) communications and, in particular, to direct VOIP services provided using an out of band (OOB) device.

BACKGROUND OF THE EMBODIMENTS

Today's diverse communication networks are widely used for corporate connectivity throughout the world. These networks provide a reliable and secure option for corporations to move data as well as access the public internet.

Managing these global networks can be challenging when things go awry. If a remote Edge router loses its configuration or becomes inaccessible over the primary network, how do you fix it?

Typically, the fix is made via an out of band (OOB) device such as, e.g., a dial modem, connected to the serial console interface of the router. Dial modems work on old technology such as, e.g., analog copper circuits. These legacy circuits are quickly becoming very difficult to order. Furthermore, sourcing, maintaining, and paying for a local analog dial circuit can be challenging in itself.

Another OOB option is incorporating the use of a cellular data connection, which can be extremely cost effective as long as you have a signal. The biggest challenge for a corporate network rollout is to determine if there will be an LTE signal at the very location in a building where the equipment will be installed. This is all but impossible to determine without a costly site survey.

There are existing external conversion devices that will allow a legacy analog based device like a "Plain Old Telephone Set" (POTS Telephone) device or an analog modem to be connected to a voice over Internet Protocol (VOIP) circuit. These legacy adapters work fair for voice connections and poor for modem connections that require very clean precise signaling. Incorporating a VOIP IP solution would thus solve many of the problems listed above.

For at least the reasons described above, a system and method of providing a direct VOIP OOB solution is needed.

Examples of related art are described below:

U.S. Pat. No. 9,356,988 pertains to methods, devices, non-transitory processor-readable instructions, and systems for a VOIP application server associated with a VOIP application to improve performance of a target computing device for IP communications via the VOIP application. An embodiment method may include determining whether the target computing device is likely to be called using the VOIP application during a contact period, and directing the target computing device to adjust a performance setting for receiving an IP communication in response to determining a likelihood the device will be called during the contact period. When a call is likely, the performance setting may be raised via transmitting dummy traffic to target computing device, activating a quality-of-service on an Rx interface corresponding to the VOIP application and the target computing device, and/or transmitting a message directing the target computing device to utilize an aggressive slot cycle index setting or an aggressive discontinuous reception setting.

U.S. Pat. No. 9,515,938 pertains to techniques for service policies for communication sessions. According to various embodiments, a service policy specifies various rules and/or procedures for handling communication sessions. For instance, a service policy can specify service priority designations to be applied to communication sessions based on various attributes of the communication sessions. Techniques discussed herein provide for automated and dynamic management of service policies in a variety of communication scenarios, e.g., via per-session customization of service policies. In at least some embodiments, techniques may be employed to remedy problems that may occur during a communication session, such as via bandwidth reallocation, dynamic remapping of routing paths, and so forth.

U.S. Pat. No. 9,681,161 pertains to methods and apparatus for delivering data over extant infrastructure within a content-based network. In one embodiment, the network comprises a cable network, and the infrastructure comprises that nominally used for on-demand (OD) services such as VOD. The method includes the allocation of dedicated end-to-end network resources via a "session request, as well as data flow control and packet size adaptation, by a data server based on feedback from the requesting/receiving client device (e.g., DSTB) within the network. Mechanisms for retransmission requests for error recovery are also provided.

None of the art described above addresses all of the issues that the present invention does.

SUMMARY OF THE EMBODIMENTS

According to an aspect of the present invention, a system for providing direct voice over Internet protocol (VOIP) services using an out of band (OOB) device is provided. The system includes one or more multiplexed wires configured to relay a consolidated digital signal, the consolidated digital signal including one or more VOIP signals from a VOIP network, and one or more digital signals from a data network. The system further includes a Session Initiation Protocol (SIP) trunk configured to filter out non-VOIP signals from the consolidated signal, enabling a filtered VOIP signal to pass through the SIP trunk, and a VOIP OOB device configured to relay the filtered VOIP signal to an edge device.

It is an object of the present invention to provide the system for providing direct VOIP services using an OOB device, wherein the filtered VOIP signal is configured to access the edge device.

It is an object of the present invention to provide the system for providing direct VOIP services using an OOB device, wherein the system further includes the edge device.

It is an object of the present invention to provide the system for providing direct VOIP services using an OOB device, wherein the edge device is further configured to send a digital signal to the VOIP OOB device.

It is an object of the present invention to provide the system for providing direct VOIP services using an OOB device, wherein the consolidated signal is configured to access the edge device.

It is an object of the present invention to provide the system for providing direct VOIP services using an OOB device, wherein at least one of the one or more multiplexed wires is coupled to a data cloud.

It is an object of the present invention to provide the system for providing direct VOIP services using an OOB device, wherein the data cloud is configured to relay the one or more VOIP signals and the one or more digital signals.

According to an embodiment, a method for providing direct voice over Internet protocol (VOIP) services using an out of band (OOB) device is provided. The method includes consolidating one or more VOIP signals from a VOIP network and one or more digital signals from a data network, forming a consolidated signal, relaying the consolidated signal using one or more multiplexed wires configured to relay the consolidated digital signal, filtering the one or more VOIP signals from the consolidated signal using a Session Initiation Protocol (SIP) trunk configured to filter out non-VOIP signals from the consolidated signal, enabling a filtered VOIP signal to pass through the SIP trunk, and relaying the filtered VOIP signal to an edge device.

It is an object of the present invention to provide the method for providing direct VOIP services using an OOB device, wherein the method further includes accessing the edge device using the filtered VOIP signal.

It is an object of the present invention to provide the method for providing direct VOIP services using an OOB device, wherein the method further includes sending an return digital signal to the VOIP OOB device.

It is an object of the present invention to provide the method for providing direct VOIP services using an OOB device, wherein the method further includes relaying the consolidated signal to the edge device.

It is an object of the present invention to provide the method for providing direct VOIP services using an OOB device, wherein at least one of the one or more multiplexed wires is coupled to a data cloud.

It is an object of the present invention to provide the method for providing direct VOIP services using an OOB device, wherein the method further includes relaying the one or more VOIP signals from the VOIP network and the one or more digital signals from the data network using the data cloud.

BRIEF DESCRIPTION OF THE DRAWINGS

FIGS. 3-4 show a method for incorporating a VOIP network for OOB connections, according to an embodiment of the present invention.

DESCRIPTION OF THE PREFERRED EMBODIMENTS

Figure 1:
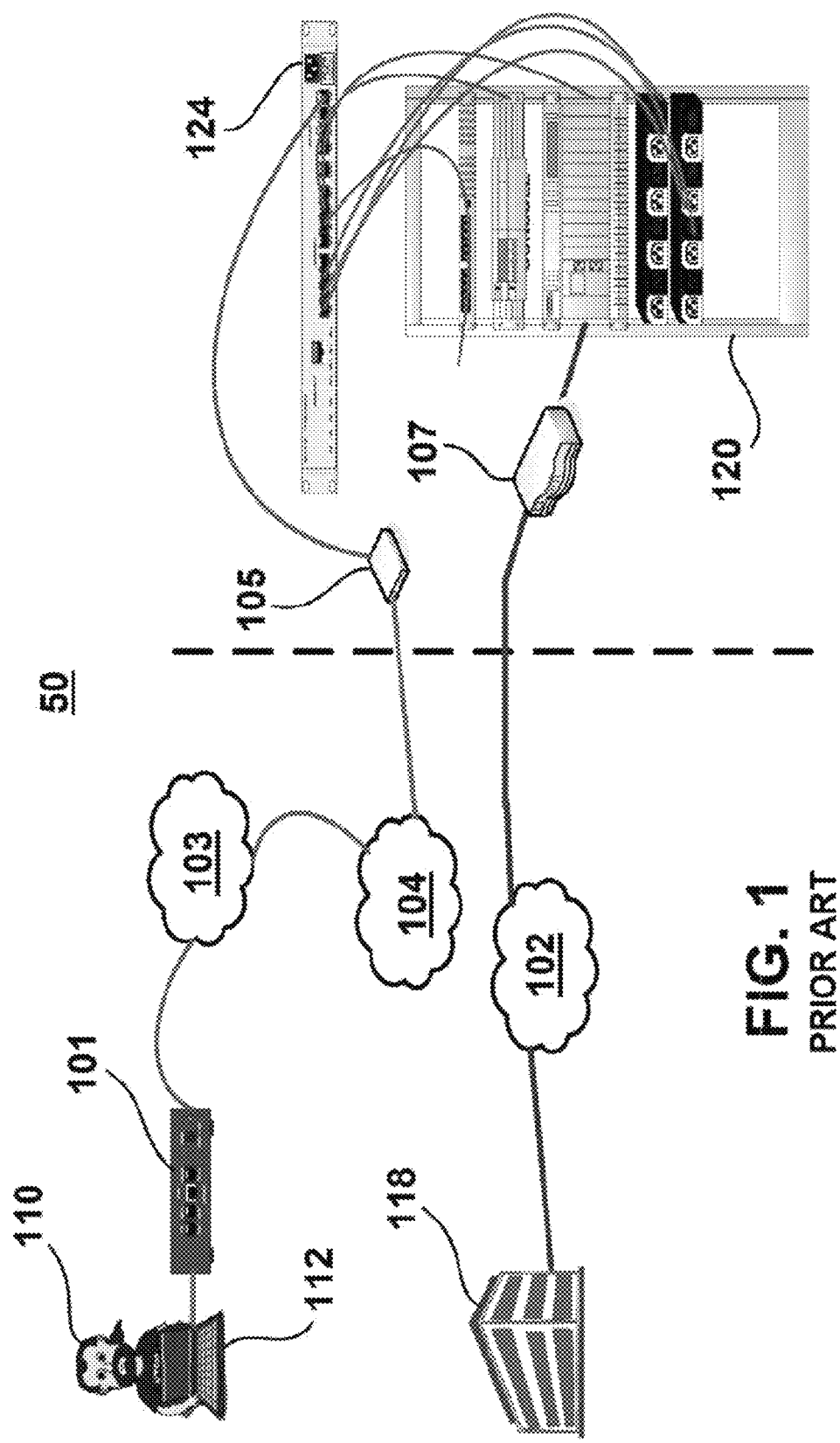
FIG. 1 shows a prior art system for incorporating a VOIP network for OOB connections via analog conversion.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1, a known system 50 for incorporating a VOIP network 104 for OOB connections via analog conversion is illustratively depicted.

According to an embodiment, the system 100 includes a private network 102, configured to send and receive data, and a VOIP network 104, configured to access an edge router's 120 console interface 124.

According to an embodiment, the VOIP network 104 is coupled to one or more analog OOB modems 101. According to an embodiment, the one or more anal OOB modems 101 are controlled by a network operations center (NOC) engineer 110, accessing the one or more analog OOB modems 101 via one or more electronic devices 112. According to an embodiment, the one or more analog OOB modems 101 sends an analog signal to a public switched telephone network (PSTN) 103 which routes the analog signal to a VOIP network 104. The analog VOIP network signal is then converted into a digital VOIP signal using one or more VOIP to analog converters 105. Any digital signals sent back from the console interface 124 to the PSTN 103 are subsequently converted back to analog using the one or more VOIP to analog converters 105.

According to an embodiment, the private network 102 may be coupled to one or more end-locations 118, which may be a business, a user, and/or any other suitable end location 118. According to an embodiment, digital signals may be routed from the private network 102 to the one or more edge routers 120 via a Domain-based Message Authentication, Reporting and Conformance (DMARC) system 107.

According to an embodiment, an external device requires an analog modem to demodulate an analog signal. The present system 100 (see FIG. 2) eliminates the need for the analog signal and converts it directly to digital data. This will allow OOB devices with this technology to connect directly to the digital VOIP network without the need for an analog modem to be used for OOB access to remote edge routers, resulting in an improvement upon the existing technologies. For example, by removing the requirement for a conversion of the data, the signal stays as a digital signal. This eliminates any signal loss caused by a conversion of the data.

Figure 2:
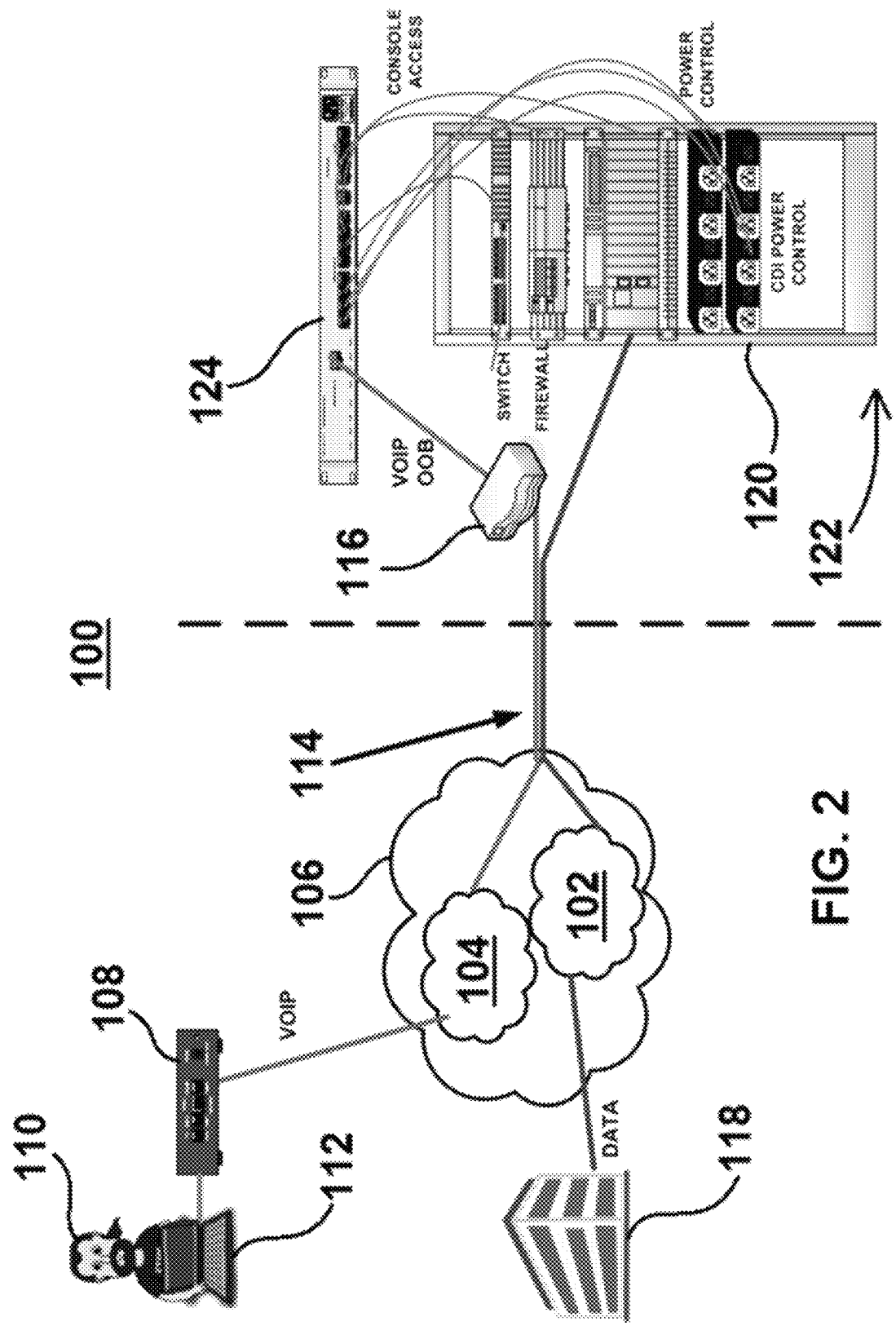
FIG. 2 shows a system for incorporating a VOIP network for OOB connections, according to an embodiment of the present invention.

Referring now to FIG. 2, an embodiment of the present invention is shown as a system 100 for incorporating a VOIP network 104 for OOB connections is illustratively depicted, in accordance with an embodiment of the present invention.

According to an embodiment, the system 100 includes a private network 102, configured to send and receive data, and a VOIP network 104, configured to access an edge router's 120 console interface 124. According to an embodiment, signals from the VOIP network 104 and signals from the private (or data) network 102 are shared over a data cloud 106. According to an embodiment, the signals from the VOIP network 104 and the signals from the private network 102 may be shared via a wired and/or wireless connection.

Many companies use voice over IP (VOIP) networks. VOIP networks 104 use the same "wires" 114 as the data network 102, but are separated logically by Multiprotocol Label Switching (MPLS) tunnels called Session Initiation Protocol (SIP) trunks 116. These SIP trunks 116 use a completely different set of routers, switches, and protocols at remote edge points 122 of a network 102, 104 such that, at the edge of the network, they are also physically separated. The SIP trunks 116 carry only VOIP traffic which is voice that has been digitized. According to an embodiment, there are VOIP OOB appliances 108, 124 at each end of the VOIP circuits According to an embodiment, the VOIP network 104 is coupled to one or more VOIP OOB appliances 108. According to an embodiment, the one or more VOIP OOB appliances 108 are controlled by a network operations center (NOC) engineer 110, accessing the one or more VOIP OOB appliances 108 via one or more electronic devices 112. However, it is noted that other suitable users may access the VOIP network 104. According to an embodiment, the one or more electronic devices 112 may include a desktop computer, a laptop computer, a tablet computer, a smartphone, and/or any other suitable electronic device 112.

According to an embodiment, the private network 102 may be coupled to one or more end-locations 118, which may be a business, a user, and/or any other suitable end location 118.

According to an embodiment, existing VOIP networks 104 that are usually also present in most corporate sites are integrated into the system 100. According to an embodiment, the VOIP networks 104 are connected to one or more edge routers 120 at a remote edge site 122. These VOIP networks 104 are used to access the edge router's console interface. It is noted, however, that new VOIP networks may also be used in conjunction with the system 100.

According to an embodiment, the system 100 includes one or more VOIP networks 104 that are configured for OOB connections. According to an embodiment, the one or more VOIP networks 104 are configured for OOB connections by mimicking an analog adapter directly connected to the VOIP network 104. It is noted, however, that other means of configuring the one or more VOIP networks 104 for OOB connections may also be used, while maintaining the spirit of the present invention.

According to an embodiment, the VOIP network 104 signal and the private network 102 signal pass through a single multiplexed wire 114. Through this single multiplexed wire 114, the VOIP OOB appliance 124 and the edge router 120 are capable of using the same wire 114. According to an embodiment, this is made possible with the use of the SW trunk 116.

The use of this SIP trunk 116 enables the VOIP OOB device 124, acting as the edge router's 120 console interface, to use a separate channel in the wire 114 for access. This enables the VOIP SIP trunk 116 to still be available for OOB access in the event that the edge router 120 has lost network connectivity. Through the VOIP OOB device 124, a user 110 is able to access the edge router 120, controlling various aspects of the edge router 120. These aspects may include, e.g., power control, firewall control, and/or any other suitable aspects. According to an embodiment, it is through this means that various edge devices may be accessed.

Figure 4:
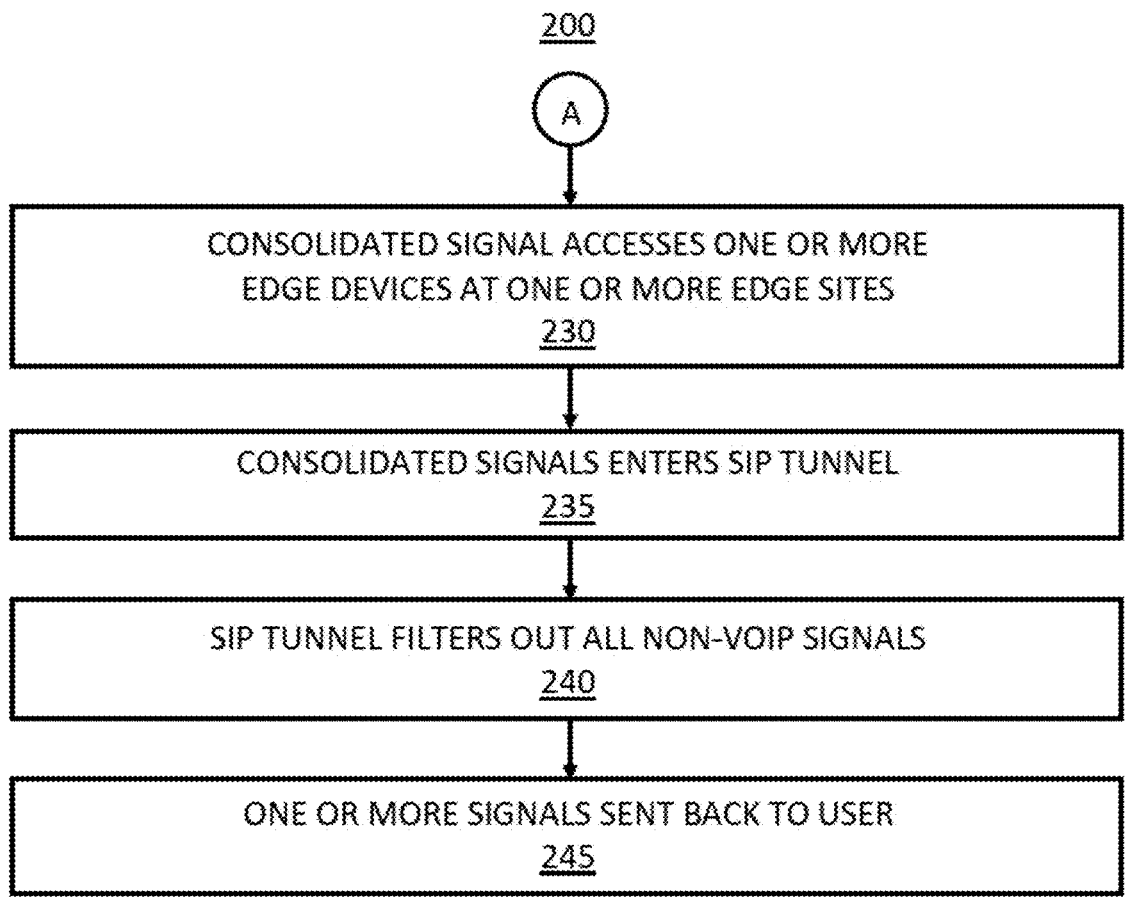

Referring now to FIGS. 3-4, a method 200 for incorporating a VOIP network for OOB connections is illustratively depicted, in accordance with an embodiment of the present invention.

At step 205, one or more first signals are converted into one or more digital VOIP signals. According to an embodiment, the one or more first signals are digital signals. It is noted, however, that, according to some embodiments, the one or more first signals may be analog signals. According to some embodiments, the conversion step (step 205) is not performed and/or not needed.

According to an embodiment, the one or more VOIP signals, at step 210, are relayed from a VOIP network 104 and, at step 215, one or more digital signals are relayed from a private (data) network 102. According to an embodiment, each of these signals is relayed using the same type of or, in some instances, the same wire 114. According to an embodiment, the wire 114 is a multiplexed wire 114, enabling both relayed signals to run on the same wire 114. According to an embodiment, one or more signals from one or more VOIP networks 104 and/or one or more private networks 102 are relayed.

At step 220, the signals from the VOIP network 104 and the signals from the private network 102 are consolidated. According to an embodiment, this consolidation occurs in a data cloud 106. According to an embodiment, once consolidated, the consolidated signals, at step 225, pass through one or more multiplexed wires 114.

According to an embodiment, at step 230, the consolidated signal accesses one or more edge devices 120 at one or more remote edge sites 122. Alternatively, at step 235, the consolidated signal enters a SIP tunnel 116. According to an embodiment, at step 240, the SIP tunnel filters all non-VOIP signals, allowing only VOIP signals to pass through the SIP tunnel 116 since the SIP tunnel 116 carries only VOIP traffic.

At step 245, one or more signals are then sent back to a user.

It is noted that any or all of the signals aforementioned may be converted, consolidated, and transported in any order and that the method steps of method 200 may be performed, according to some embodiments, in any suitable order and that all steps in method 200 need not be performed according to every embodiment of the present invention.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system for providing direct voice over Internet protocol (VOIP) services using an out of band (OOB) device, the system comprising:
   a single multiplexed wire coupled to a data cloud and configured to relay a consolidated digital signal, the consolidated digital signal including:
      one or more VOIP signals from a VOIP network, wherein the VOIP network is configured to access a console interface of an edge router at a remote edge site; and
      one or more digital signals from a data network, wherein the one or more VOIP signals and the one or more digital signals are shared over the data cloud and pass through the single multiplexed wire such that a VOIP OOB device and an edge device use a same wire;
   a Session Initiation Protocol (SIP) trunk configured to:
      enable the VOIP OOB device, acting as the console interface of the edge router, to use a separate channel in the single multiplexed wire for access such that the SIP trunk is available for OOB access in an event that the edge router loses network connectivity; and
      filter out non-VOIP signals from the consolidated signal, enabling a filtered VOIP signal to pass through the SIP trunk;
   the edge device; and
   the VOIP OOB device configured to relay the filtered VOIP signal to the edge device.

2. The system as recited in claim 1, wherein the filtered VOIP signal is configured to access the edge device.

3. The system as recited in claim 1, wherein the edge device is further configured to send a digital signal to the VOIP OOB device.

4. The system as recited in claim 1, wherein the consolidated signal is configured to access the edge device.

5. A method for providing direct voice over Internet protocol (VOIP) services using an out of band (OOB) device, the method comprising:

accessing, via a VOIP network, a console interface of an edge router at a remote edge site;

consolidating one or more VOIP signals from the VOIP network and one or more digital signals from a data network, forming a consolidated signal;

relaying the consolidated signal using a single multiplexed wire coupled to a data cloud and configured to relay the consolidated digital signal;

relaying the one or more VOIP signals from the VOIP network and the one or more digital signals from the data network using the data cloud such that the one or more VOIP signals and the one or more digital signals pass through the single multiplexed wire to allow a VOIP OOB device and an edge device to use a same wire;

enabling, using a Session Initiation Protocol (SIP) trunk, the VOIP OOB device, acting as the console interface of the edge router, to use a separate channel in the single multiplexed wire for access such that the SIP trunk is available for OOB access in an event that the edge router loses network connectivity;

filtering the one or more VOIP signals from the consolidated signal, using the SIP trunk, configured to filter out non-VOIP signals from the consolidated signal, enabling a filtered VOIP signal to pass through the SIP trunk; and relaying the filtered VOIP signal to the edge device.

6. The method as recited in claim 5, further comprising accessing the edge device using the filtered VOIP signal.

7. The method as recited in claim 5, further comprising: sending an return digital signal to the VOIP OOB device.

8. The method as recited in claim 5, further comprising: relaying the consolidated signal to the edge device.

\* \* \* \* \*